(12) United States Patent
Bonmann

(10) Patent No.: US 7,914,757 B1
(45) Date of Patent: Mar. 29, 2011

(54) PROCESS AND DEVICE FOR IMMOBILIZING MERCURY BY PRODUCING CRYSTALLINE MERCURY SULFIDE FOR SUBSEQUENT DISPOSAL OF MERCURY SULFIDE

(75) Inventor: Christian Bonmann, Essen (DE)

(73) Assignee: DELA GmbH Recycling und Umwelttechnik, Bad Oeynhausen (DE)

( * ) Notice: Subject to any disclaimer, the term of this patent is extended or adjusted under 35 U.S.C. 154(b) by 0 days.

(21) Appl. No.: 12/621,816

(22) Filed: Nov. 19, 2009

(51) Int. Cl.
*B01D 53/64* (2006.01)
*C01B 17/20* (2006.01)
(52) U.S. Cl. ..................................... 423/210; 423/566.1
(58) Field of Classification Search .................. 423/210, 423/566.1
See application file for complete search history.

(56) References Cited

U.S. PATENT DOCUMENTS

| | | | |
|---|---|---|---|
| 4,640,751 A * | 2/1987 | Dyvik et al. | 205/562 |
| 5,034,054 A | 7/1991 | Woodward | |
| 7,560,087 B2 | 7/2009 | Riviere-Huc et al. | |
| 7,691,361 B1 * | 4/2010 | Boyle et al. | 423/566.1 |

* cited by examiner

*Primary Examiner* — Timothy C Vanoy
(74) *Attorney, Agent, or Firm* — Roberts Mlotkowski Safran & Cole, P.C.; David S. Safran

(57) ABSTRACT

A process for immobilizing mercury by producing crystalline mercury sulfide for subsequent disposal of the mercury sulfide, the mercury sulfide being formed by the reaction of elemental mercury and an additive material of elemental sulfur or a sulfur compound. The reaction of the mercury and of the additive material takes place at least during one time interval at a temperature above the melting point of the additive material.

19 Claims, 2 Drawing Sheets

PROCESS AND DEVICE FOR IMMOBILIZING MERCURY BY PRODUCING CRYSTALLINE MERCURY SULFIDE FOR SUBSEQUENT DISPOSAL OF MERCURY SULFIDE

BACKGROUND OF THE INVENTION

1. Field of Invention

The invention relates to a process for immobilizing mercury by producing crystalline mercury sulfide for subsequent disposal of the mercury sulfide, the mercury sulfide being formed by the reaction of elemental mercury and an additive material of elemental sulfur or a sulfur compound.

2. Description of Related Art

Due to its special physical properties, mercury is used in many technological applications and in industrial production. Here, especially electrolysis of alkali-metal chlorides is used to recover chlorine. In addition to a plurality of positive properties, mercury is, however, a toxic, hazardous material which constitutes a danger to man and the environment especially as a result of its vapor pressure which is comparatively high at room temperature. Numerous accidents and almost irreversible environmental damage in the past have helped mercury to a doubtful popularity.

Against this background, nowadays, in many areas, mercury or entire production processes are being replaced to reduce the use of mercury, and thus, mercury emissions, as much as possible. The reduced demands lead to a reduction through termination of production of primary mercury at known production facilities. For many years secondary mercury has been recovered from scrap in recycling installations and offered on the market as an alternative to primary mercury. Very large amounts of secondary mercury will be made available in the future with the worldwide conversion of existing chlorine production from amalgam processes to membrane processes. Over the long term, it will not be possible to use the mercury made available from these installations in other environmentally safe applications. Against this background, it becomes necessary to make available an environmentally safe, final disposal possibility for elemental mercury.

One possibility of conversion of elemental mercury into a stabilized mercury compound consists in producing mercury sulfide (cinnabar). Mercury sulfide is a stable or stabilized compound which, as a result of its properties (nontoxic, chemically stable, and even under corrosive conditions), allows permanent and safe storage of mercury. Otherwise, it is fundamentally also possible to produce mercury sulfide using sulfur compounds.

U.S. Pat. No. 5,034,054 discloses a process for producing a stabilized mercury compound for subsequent disposal. Here, mercury is bound in the form of an amalgam in conjunction with copper, zinc or nickel as the additive material or as mercury sulfide in conjunction with sulfur as the additive material, and then, is disposed of in an environmentally safe manner. In the known process, the additive material is added to the mercury in a stoichiometric ratio of at least 1:1 and preferably 3:1. The mixing process is carried out at room temperature and ambient pressure. The disadvantage of the known process is that the additive material must be added to the mercury in a highly superstoichiometric ratio in order to ensure a sufficient reaction of the mercury to the mercury compound. Another disadvantage of the known process is that, with respect to the highly superstoichiometric excess of the additive material which is added in powder form, is that, after treatment, portions of free sulfur are still present which can be a problem for further handling of the final product (fire prevention, aerosols).

U.S. Patent Application Publication 2008/0019900 A1 discloses a process for producing mercury sulfide by the reaction of liquid mercury with solid sulfur. The process is carried out in a rotating reactor which is formed of a piston, a pipe attached to it and a feed device for adding mercury and sulfur. The reaction takes place at 20° C. to 100° C., preferably at 60° C. to 80° C., at ambient pressure.

SUMMARY OF THE INVENTION

The object of this invention is to provide a process and a device for immobilizing mercury by producing crystalline mercury sulfide, conversion of the initial products into mercury sulfide as good as possible taking place and immobilization as reliable as possible being ensured.

This object is achieved essentially in a first alternative in accordance with the invention in that the reaction or mixing of the mercury and of the additive material takes place at least during one time interval of the mixing process and the reaction at a temperature above the melting point of the additive material.

In conjunction with the invention, it has been recognized that the highly superstoichiometric addition of the additive material according to U.S. Pat. No. 5,034,054 is therefore necessary since the reaction of the sulfur with the mercury can only take place on the surface of the sulfur particles which are present in the solid state. In order to enable a complete reaction of the sulfur with the mercury, in this solid-liquid reaction, a high excess of the sulfur is necessary. A temperature of at least roughly 115° C. which is increased in this invention, when elemental sulfur is used as the additive material under normal conditions, during the mixing process or the reaction leads as such first, on the one hand, to the vapor pressure of the mercury being further elevated. Thus, a larger part of the mercury passes into the vapor phase than is the case at room temperature. Altogether with the increase in the proportion of mercury vapor, the reaction possibility of the mercury with the sulfur which has not been reacted until then is distinctly improved, and thus, the quantitative conversion of sulfur is increased, and finally, conversion in a stoichiometric or slightly superstoichiometric ratio of the two reaction partners (i.e., reaction components) is possible.

It is especially advantageous with respect to complete conversion of the starting materials to mercury sulfide if the temperature at the start of the process is first below the melting point of sulfur. In this connection, generally, a reaction of most of the mercury with most of the sulfur takes place. At the same time, the crystalline mercury sulfide which forms in the reaction can be comminuted to the desired grain sizes in the mixing device by way of suitable means. After a given instant, especially at the end of the process, the temperature is then first increased above the melting point of the additive material. In this way, then, there is further conversion of the mercury which is still present with the sulfur which is still present. At the end of the process, the temperature is raised to a few degrees below the boiling point of mercury. This comprises a temperature in the temperature interval of a maximum 30° C. below the boiling point of mercury. The increase of the temperature to the aforementioned values causes the following. First, on the one hand, the aggregate state of the additive material (elemental sulfur or a sulfur compound) from solid to liquid changes. Furthermore, the temperature increase leads to a further increase of the vapor pressure of mercury. At the same time, depending on the temperature, a sulfur vapor forms. Thus, in the mixing means, different mixing processes are triggered, specifically relative to the mercury/sulfur, the mixing processes liquid/solid (at least during the initial phase of the reaction until the melting point of the additive material is reached), liquid/liquid, liquid/gaseous, gaseous/solid, gaseous/liquid, and gaseous/gaseous. In this way, optimized, and thus, complete conversion of the starting materials to mercury sulfide is achieved.

In one alternative preferred embodiment of this invention which is, however, suitable specially in conjunction with the aforementioned embodiment, it is provided that mixing is performed in the mixing means at a negative pressure. Here, a negative pressure is any pressure below the ambient pressure as far as a vacuum. Small negative pressures of 0.05 bar are sufficient; this corresponds to absolute pressures of 0.95 bar at an ambient pressure of 1 bar. The execution of the mixing process at negative pressure results, as described above, in that the boiling point of the mercury drops accordingly, and at lower temperatures, a high concentration of mercury in gaseous form is achieved in the mixer housing of the mixing means, by which the mercury reacts more quickly with the sulfur to form mercury sulfide.

It is especially preferable to carry out the mixing process in a temperature range within the mixing means, for example, in the region of the boiling point for mercury with simultaneous negative pressure. This can result in that all the elemental mercury still present during the mixing process is transferred into the gaseous phase, and thus, optimum mixing with sulfur can take place. Otherwise, it is also useful with respect to safety to carry out the process in accordance with the invention at a reduced pressure in a closed mixer since, in this way, even when reaching the boiling point of mercury, according to the set negative pressure, mercury vapors cannot escape or lower temperatures can be used. Otherwise, executing the mixing process at negative pressure roughly at the boiling point of mercury or a few degrees below has the advantage that, if a malfunction occurs in the mixing means, only the normal pressure need be established; at the same time, this leads to the boiling point of the mercury rising, and thus, the resulting vapor pressure of the mercury within the mixing means remaining always less than the ambient pressure.

Otherwise, it has been established that, in conjunction with this invention, therefore, essentially due to the aforementioned temperature conditions and/or application of a negative pressure, it is possible for the red crystalline form of mercury sulfide to be formed. The red form of mercury sulfide is the form of mercury sulfide most stable in terms of energy. Differently from the black crystalline form of mercury sulfide, a product can be achieved by the invention which is suitable to a special degree for permanent immobilization.

In particular, when executing the process in accordance with the invention, in the aforementioned temperature range and/or at a negative pressure, it is possible to add the starting components in a stoichiometric or slightly superstoichiometric ratio. The stoichiometric ratio of elemental sulfur to mercury is 0.16:1. At this ratio there is ideal conversion of the starting components into mercury sulfide. For incomplete conversion, the upper boundary value for the ratio of sulfur to mercury is 0.4:1, and thus, still 100% below the lower boundary of the mixing ratio which is named in U.S. Pat. No. 5,034,054. Preferably, the ratio between the elemental sulfur and mercury in this invention is between 0.16:1 to 0.32:1 and especially between 0.16:1 and 0.18:1.

In one preferred embodiment of this invention, the mixing means is preferably repeatedly flushed with inert gas to achieve an oxygen-free atmosphere. In doing so, the mixing device is rendered inert before executing the reaction and before delivering the reaction partners into the mixing device so that the reaction partners can be reacted in an oxygen-free atmosphere. The formation of $SO_2$ and $HgO$ during the mixing process can be precluded by the oxygen-free atmosphere which has been achieved here.

Otherwise, to avoid vapors or aerosols which may occur during mixing, it is favorable if the mixing process is carried out in a closed, gas-tight and/or vacuum-tight space of the mixing means. By this closed and/or vacuum-tight application, ultimately, there are no emissions in conjunction with the process in accordance with the invention.

The starting components are mixed in the mixing means preferably by either the mixer housing rotating during the mixing process or the mixer housing being installed stationary and by there being a sealed mixer shaft with a plurality of mixer blades which rotate within the mixer housing. Here, mixing according to the invention is not fixed at a certain rpm. It fundamentally applies that the better the mixing, the more intensive, i.e., the faster, the reaction between the mercury and sulfur will take place.

In tests which have been carried out, it has been established that the mixing process is carried out over a treatment time between 10 minutes and three hours, especially between 20 minutes and two hours and especially 30 minutes and one hour in order to ensure complete conversion of the existing starting components into mercury sulfide.

Instead of a discontinuous process, it is also fundamentally possible to undertake a continuous process for immobilization of mercury by reaction with sulfur to mercury sulfide, the reactor being continuously supplied with the mercury and additive material, the mercury and the additive material being heated in the reactor and being transferred into the gaseous state and the reaction between the mercury and the additive material taking place entirely in the gaseous phase.

According to the apparatus, in conjunction with the continuous process, there is a preferably indirectly heatable reactor for transfer of the elemental mercury and elemental sulfur and/or the additive material which contains a mercury compound into the gaseous state, and the reactor can be supplied continuously with mercury and the additive material via a correspondingly made feed device. The reactor can be a preferably upright tube reactor which ensures high reaction rates of the gaseous components. Otherwise indirect heating of the reactor leads to simplification of the process.

In conjunction with continuous production of mercury sulfide, it is also provided that the mercury sulfide which can be obtained in the reaction in the reactor is continuously removed from the reactor in vapor form. The operating temperature in the reactor is preferably above the boiling point of mercury sulfide and above the vaporization temperature so that the mercury sulfide which has formed does not condense or resublimate within the reactor. The operating temperature in the reactor should, therefore, preferably be above roughly 580° C., but can also be chosen to be higher in order to be able to reliably preclude condensation or resublimation of mercury sulfide. Provided the reactor is being operated at negative pressure, the operating temperature can also be reduced accordingly.

Operation of the reactor at temperatures in the range above the boiling temperature of mercury sulfide, otherwise, leads to the starting components, after delivery into the reactor, being transferred very quickly into the gaseous phase. In this way, the necessary dwell time in the reactor can be reduced accordingly and the amount of production of mercury sulfide can be raised accordingly.

The reactor can be supplied with a preferably homogenized mixture of liquid mercury and powdered additive material.

This enables continuous feed of the reactor with the parent materials which is simple in terms of process engineering. It goes without saying that there must be a feed device which is made for continuous feeding of the reactor with a homogenized mixture. Fundamentally, there can also be a metering system, mercury and the additive material being supplied separately to the reactor from collecting tanks in the desired mixing ratio.

The design of the reactor and the quantitative flows of material should be chosen such that the computed dwell time of the mercury and the additive material in the reactor is at least one second to 6 seconds, preferably less than four seconds. In this way, sufficient conversion into the gaseous phase reaction between the mercury and the additive material is ensured.

Preferably, the reactor and also the other devices participating in the production of the mercury sulfide are operated gas-tight in the device in accordance with the invention so that, in the continuous production of mercury sulfide, the mercury sulfide cannot escape into the surrounding environment. In this way, environmentally safe production of mercury sulfide from the starting components is possible.

The reactor can be supplied by way of a vacuum pump or vacuum fan with a low negative pressure in order to satisfy operating reliability and to preclude the escape of mercury sulfide from the reactor. It goes without saying that operation under a slight negative pressure relates to all means of the device in accordance with the invention through which gaseous mercury sulfide flows.

Furthermore, in the process in accordance with the invention, it is provided that the mercury sulfide vapor, after discharge from the reactor, is abruptly cooled with a liquid or vapor cooling medium at least until a solid state is achieved, preferably to a temperature of less than 50° C., and together with the cooling medium is subjected to solid-liquid separation. The cooling medium can be water, and for cooling of the mercury sulfide a quench and/or water jet pump can be provided. So that unwanted condensation or resublimation of the mercury sulfide does not take place before abrupt cooling, a heatable line for the mercury sulfide between the reactor and the quench and/or the water jet pump can be provided. With operation of the quench or the water jet pump, in regular operation, a sufficient pressure gradient to the reactor is established so that it is possible to operate the system without the vacuum pump or vacuum fan at a low negative pressure and without having to fear the escape of mercury sulfide into the environment.

The quench or the water jet pump can be supplied with cooled water; this leads to abrupt cooling of the mercury sulfide vapor which is subsequently supplied together with the water to a solid-liquid separating stage in order to separate the cooled mercury sulfide from the cooling medium. The cooling medium can be recirculated; this leads to a saving of operating costs.

The solid-liquid separation of solid mercury sulfide and the liquid cooling medium can take place by gravity separation in a sedimentation tank and/or by centrifugal separation in a centrifuge. The high density of the mercury sulfide of 8.1 g/cm$^3$ enables simple and economical separation of mercury sulfide from the cooling or washing water. The solid mercury sulfide obtained in this way can be pressed following the solid-liquid separation and optionally dried. In this connection, there can be a pressing means, preferably a filter press, and the mercury sulfide filter cake obtained in this way can then be dried in a vacuum mixer and/or a drying oven.

Otherwise, it is preferable if the mercury sulfide produced using the process in accordance with the invention, after mixing, is discharged via a closed discharge means which is coupled to the mixing means. By implementing a closed discharge means, the mercury sulfide which has been produced can be removed without dust release and then can be loaded dust-tight into the corresponding tanks for final storage.

In tests which were conducted in conjunction with a discontinuous process, it was established that the mixing process, depending on the process conditions, specifically especially the temperature and the applied negative pressure, should be carried out over a treatment time between 10 minutes and three hours, especially between 20 minutes and two hours, and especially between 30 minutes and one hour in order to achieve complete conversion of the starting components into mercury sulfide. Here, depending on the size of the mixing means, per mixing process a batch between 10 and 10,000 liters of starting components can be supplied.

Otherwise, it can be a good idea before or during the mixing process to supply at least one loading material for conditioning of the mercury sulfide which has been produced. In particular, a loading material can be used by which the mercury sulfide acquires a grainy form.

It is also preferred if the mercury sulfide, after mixing, is discharged via a closed discharge means coupled to the mixing means. This closed discharge means can ensure that, even when the mercury sulfide is being removed, no emissions occur so that the entire process can ultimately be carried out at least essentially free of emissions.

According to the apparatus in conjunction with the above described process, a mixing means which has a mixer housing is provided for mixing of the elemental mercury with the additive material. Here it is provided in one alternative in accordance with the invention that the mixer housing is assigned a heating means in order to heat the starting components located in the mixer housing at least above the melting temperature of the additive material.

In one alternative embodiment which, however, is especially suitable in conjunction with the aforementioned embodiment, the mixing means is made as a vacuum mixer with a pressure-tight and vacuum-tight mixer housing, a vacuum pump means being assigned to the mixer housing.

Advantageously, an inert gas supply for rendering the mixing space inert is assigned to the mixer housing.

Furthermore, the mixing means preferably has a rotary drive either for the mixer housing when it is turned, or for a mixer shaft with mixer blades attached to it in order to ensure intensive mixing of the mercury and of the sulfur. In an experimentally operated system with a mixer shaft and mixer blades attached to it, different rpm and different wall distances of the mixer blades were tested. Here, it was ascertained that with increasing rpm and reduced wall distance of the mixer blades optimization of the reaction time can be observed.

Otherwise, a closed discharge means for the mercury sulfide is assigned to the mixer housing. The mercury sulfide can be discharged dust-free from the mixer via this discharge means.

Furthermore, the device in accordance with the invention has a feed means connected upstream of the mixing means in the process direction, via which the starting components can be supplied. Here, it goes without saying that the feed means, altogether, constitutes a closed system so that no emissions can occur here.

It is expressly pointed out that all the aforementioned range information includes all intermediate intervals and individual values within the pertinent range including possible decimal places even if these intermediate intervals and individual values are not given individually.

The process in accordance with the invention is also described below using the drawings. In any case, it is pointed out that the invention is not limited to the illustrated embodiment.

DETAILED DESCRIPTION OF THE INVENTION

Figure 1:
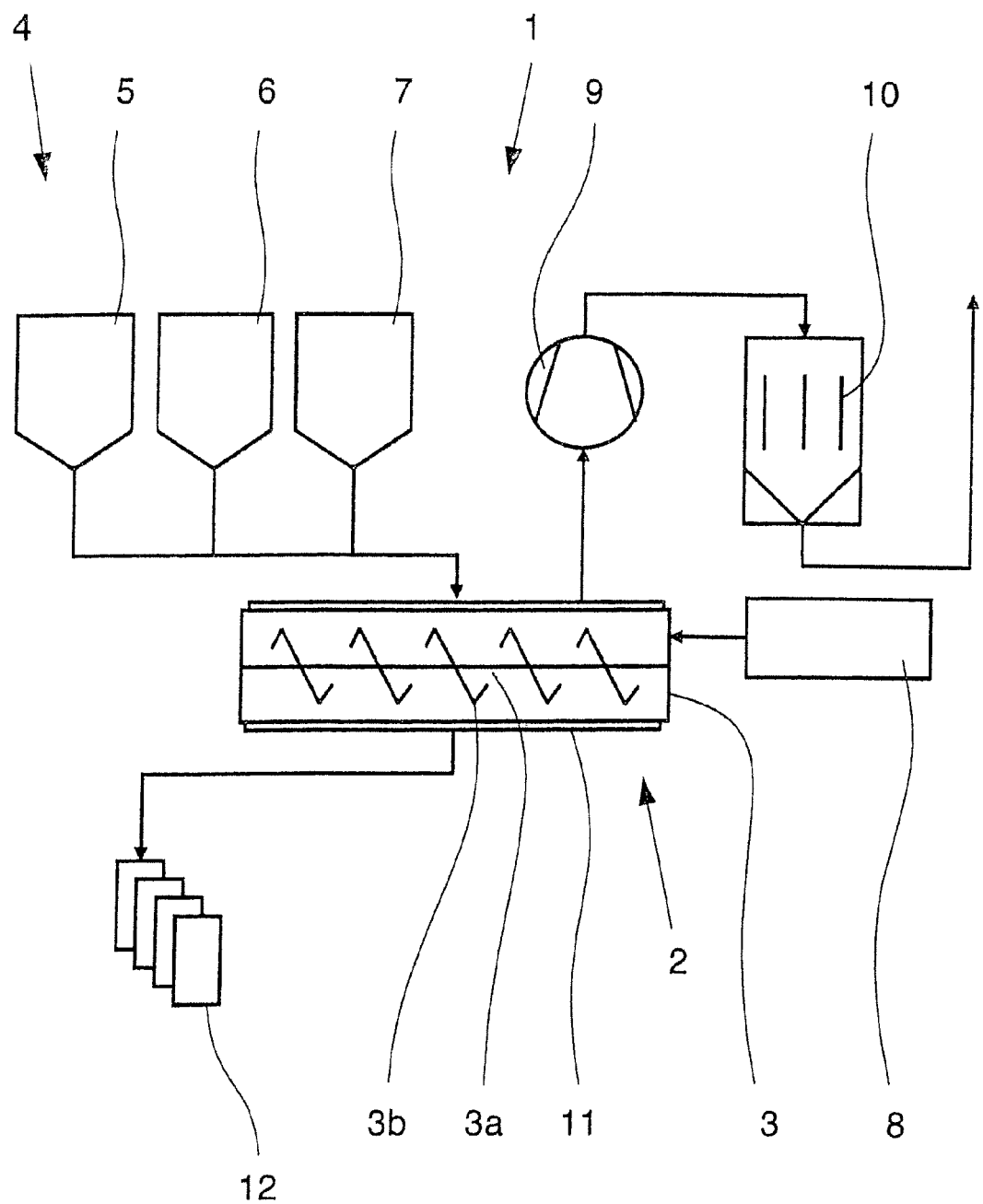
FIG. 1 is a schematic illustration of a device for producing mercury sulfide for subsequent disposal.

A device 1 is shown for producing mercury sulfide (HgS) and elemental mercury (Hg) and elemental sulfur (S) for final, green disposal. The device 1 has a mixing means 2 with a mixer housing 3. The mixing device 1 here is a vacuum mixer in a horizontal construction, and it is pointed out that other designs and arrangements are also possible and are no less efficient.

A feed means 4 is connected upstream of the mixing means 2. In the illustrated embodiment, the feed means 4 has three collecting tanks 5, 6, 7. In the collecting tank 5 is liquid elemental mercury, while in the collecting tank 6 is powdered elemental sulfur. In the collecting tank 7, which is optionally provided, there are loading materials for conditioning which, if necessary, together with the mercury and sulfur can be supplied to the mixer housing 3; however, if necessary, the loading materials are supplied only during or after the actual mixing process.

Instead of the illustrated collecting tanks 5, 6, 7, the starting components can also be supplied, alternatively, from movable tanks which then are placed above the mixing means 2 to which they are fed.

The starting components can be conveyed from the feed means 4 and the respective collecting tank 5, 6, and optionally tank 7, in the desired ratio, to the mixer housing 3 by means of known automatic metering technology. For this purpose, a conveyor means which is not individually shown is used for the feed means 4 which is sealed relative to the outside so that neither mercury nor sulfur particles or particles of the optionally supplied loading material can escape into the surrounding environment.

Feeding of the mixing means 2 takes place in a stoichiometric or in a slightly superstoichiometric ratio of the powdered elemental sulfur to liquid mercury with an S:Hg ratio of 0.16:1 to 0.32:1, and especially, between 0.16:1 and 0.18:1. It is pointed out that the process, however, can fundamentally also be carried out in any other superstoichiometric ratio with an excess of sulfur. In any case, the aforementioned slightly superstoichiometric metering offers efficient and complete binding of the mercury. The metering, as such, takes place by separate branching of the starting components mercury and sulfur and of the optionally supplied loading material from the collecting tank 7. The corresponding weighing means following the individual collecting tanks are not shown.

Preferably, first the sulfur and only afterwards the mercury are delivered into the mixer housing 3. After filling the mixer housing 3 with the starting components in predetermined metered amounts, the mixer housing 3 is sealed gas-tight. Before filling the mixer housing 3, it is flooded with inert gas, for example, nitrogen, via the inert gas supply 8 so that the starting components are already being supplied to an oxygen-free atmosphere in the mixer housing 3. At the same time, the interior is evacuated via a vacuum pump means 9. The exhausted gas is then supplied to a filter means 10, which is an activated charcoal filter 10, here. Then, the cleaned exhaust air is discharged from the filter means 10. Rendering the mixing space within the mixer housing 13 inert constitutes a safety routine here to preclude unwanted reactions of the starting components with oxygen. However, it is not critical to render the space inert, and fundamentally, doing so can even be eliminated.

At the same time, with or after rendering the mixing space inert, a negative pressure is produced in the mixing space of the mixer housing 3 by the vacuum pump means 9.

Here, a negative pressure of 0.1 bar at an absolute pressure of 0.9 bar in the mixer housing 3 is established by way of the vacuum pump means 9. Then, the mixer drive, and thus, the mixing process are started. The mixer shaft 3a with the mixer blades 3b attached to it begins to turn with low rpm. In this way, after a short time, the mixing and fine distribution of the liquid mercury with the sulfur powder take place. As a result of the applied negative pressure and the resulting vapor pressure increase of the mercury, a spontaneous reaction of the mercury with the sulfur begins.

Parallel to the started mixing process, the mixer housing is heated to above room temperature. To do this, a heating means 11 assigned to the mixer housing 3 is used. The heating means 1 acts directly on the outer wall of the mixer housing 3. The external heating of the mixer housing 3 yields indirect heating of the mixing space through the walls of the mixer housing 3 and heat transfer to the starting components which are located in the mixer housing 3. The mixer housing 3 is heated first such that the reaction takes place first between the solid sulfur and the liquid mercury. Therefore, a temperature below the melting point of the sulfur is established. The reason for this is that, in this way, an overly vigorous reaction of the mercury with the sulfur is avoided. Then, the temperature is increased, first above the melting point of the sulfur. This then yields a further reaction of the sulfur with the mercury. Then, the temperature in the mixing space is raised further until roughly the boiling point of the mercury is reached. Here, the temperature is preferably somewhat below the boiling temperature of the mercury. Since the process is carried out in negative pressure, the boiling temperature of the mercury is reduced relative to the boiling temperature under the conditions of the space. In one preferred embodiment with a low negative pressure, the boiling temperature in the mixing space is reached at 200° C. The heating is controlled depending on the corresponding sensors which are coupled to the heating means 1.

Depending on the established vacuum or absolute pressure in the mixer housing 3 and as a result of the rising temperature, during the reaction some of the mercury and the sulfur which has a melting point between 112° C. to 119° C. passes into the gaseous phase. Due to the high affinity of mercury and sulfur, the resulting gaseous phase immediately reacts quantitatively to form mercury sulfide. Due to the comparatively high vapor pressure of mercury, mercury vapors are quickly formed; this first leads to a better distribution of the mercury and reaction on the surfaces of the sulfur particles. When the melting point of the sulfur is exceeded and with further heating, then, sulfur vapors are also increasingly formed and under these optimum conditions react immediately with the mercury vapors to form mercury sulfide. The combination of the liquid-solid reaction with the gaseous phase reaction which is proceeding in parallel within the mixer housing 3 leads to very rapid and complete conversion of the existing mercury into mercury sulfide. The existing disadvantage of poor miscibility of liquid mercury, which has a high density and surface tension, with sulfur powder is compensated in this process by the at least partial transfer of mercury into the gaseous phase and partial transfer of the sulfur into the liquid and the gaseous phase.

In tests run previously, complete conversion of the mercury contained in the charge, i.e., in the mixing process in the mixer housing 3, was demonstrated by subsequent measurements of the mercury concentration in the atmosphere over the mercury sulfide. To do this, samples of the mercury sulfide which had been produced were placed in glass flasks which could be sealed gastight, and then, the atmosphere which has been established in them was checked using atomic absorption spectrometry (AAS). Using this method, free, i.e., elemental mercury, could no longer be detected.

After the complete reaction, the mercury sulfide is removed via the discharge door of the mixer housing 3 (not shown). The discharge takes place by way of a closed discharge means (not shown) and which is a preferably cooled conveyor worm. This makes it possible not only to cool the mercury sulfide, but also to load it without dust release from the mixer directly into tanks 12 which are suitable for final storage and which are connected dust-tight.

As has been stated above, it is possible by the loading material located in the collecting tank 7 and by other loading materials which are located optionally in other collecting tanks to condition the mercury sulfide which has been produced within the mixer housing. Thus, it is easily possible by corresponding loading materials to produce the mercury sulfide in a grainy, nondusty consistency in order to thus enable open handling of the mercury sulfide which has been produced.

For producing mercury sulfide according to the above described process, treatment times in an experimental installation for complete conversion of the mercury were determined to be between 30 minutes and one hour. The attainable throughput of the device 1 as a result depends on the size of the mixing means 2 used. When using mixing means with a 100 to 10,000 liters capacity, several tons of mercury sulfide can be produced daily.

Figure 2:
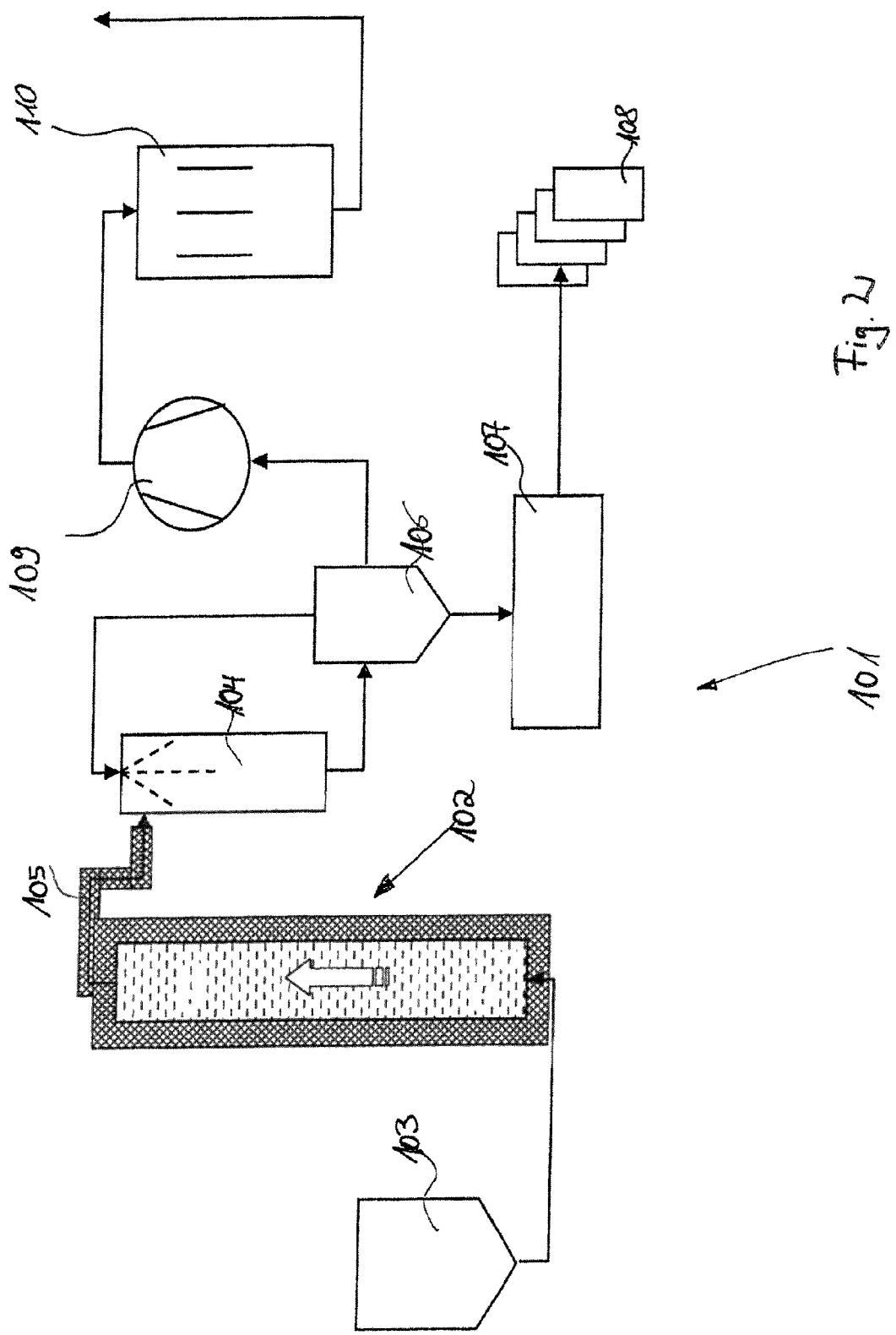
FIG. 2 is a schematic illustration of a device for continuous production of mercury sulfide for subsequent disposal.

FIG. 2 shows a device 101 for continuously producing mercury sulfide (HgS) from elemental mercury (Hg) and elemental sulfur (S) for final green disposal. The mercury is preferably secondary mercury. The device 101 has a reactor 102 which is made as an upright tube reactor, which can be indirectly heated and which is made for transfer of elemental mercury and elemental sulfur and/or an additive material which contains the sulfur compound into the gaseous state. It is not shown, in particular, that the reactor 102 has a feed means which enables continuous feeding of the reactor 102 with the mercury and the additive material from the collecting tank 103. The collecting tank 10 contains a premixed and largely homogenized mixture of sulfur and mercury.

In the reactor 102, at the operating temperature which is above the boiling or vaporization temperature of mercury sulfide, the parent mixture of mercury and elemental sulfur which is continuously supplied to the reactor 102 is transferred into the gaseous state. This is followed by a continuous gas phase reaction between the starting components which are in the gaseous state, the mercury sulfide vapor which can be obtained in this way at a computed dwell time of the starting components in the reactor 102 of more than one second to preferably less than four seconds being continuously discharged from the reactor 102 and being supplied to a quench 104. A line 105 which is shown by way of example between the reactor 102 and the quench 104 can be heated in order to prevent condensation or resublimation of mercury sulfide in the line 105.

In the gaseous phase reaction in the reactor 102, red crystalline mercury sulfide is obtained. Red mercury sulfide is insoluble in water, acids (exception—aqua regia) and lyes, and is stable and nontoxic. Therefore, red mercury sulfide is suitable for permanent disposal.

The quench 104 is supplied with recirculated cooling water so that, in the quench 104, sudden cooling of the mercury sulfide into the range of the solid phase of mercury sulfide takes place. Preferably, the mercury sulfide is cooled to a temperature between 25° C. and 50° C. Then, the solid mercury sulfide which has been obtained in this way, together with the cooling water, is supplied to the centrifuge 106 of a solid-liquid separation stage, and in the centrifuge 106, the solid mercury sulfide is separated from the liquid cooling water. The cooling water is then returned to the quench 104, and interposed cooling of the cooling water can be provided.

Following solid-liquid separation, the mercury sulfide is supplied to a filter press 107. The filter cake produced in this way can then be dried in a drying means (not shown) individually and is then delivered into a packing drum 108 designed for final storage.

Otherwise, there is a vacuum pump 109 for acquiring the vaporous mercury sulfide portions and for supplying them to the activated charcoal filter 110.

The gas flow which passes through the activated charcoal filter 110 can be diverted to the vicinity afterwards.

As a result, this invention provides a process and a device for producing mercury sulfide for final environmentally safe disposal, which is characterized by high efficiency in a complete reaction of the mercury with high labor and emission safety at simultaneously comparatively low technical effort.

What is claimed is:

1. A process for immobilizing mercury by producing crystalline mercury sulfide for subsequent disposal of the mercury sulfide, comprising the steps of:
   introducing into a mixing device elemental mercury and an additive material composed of elemental sulfur or a sulfur compound, sealing the mixing device, heating the mercury and the additive material, mixing the mercury and the additive material, and reacting the mercury and the additive material to form the crystalline mercury sulfide, and
   performing at least part of the reaction of the mercury and of the additive material at a temperature above the melting point of the additive material.

2. A process in accordance with claim 1, wherein the reaction of the mercury and of the additive material is performed at least in part at a negative pressure.

3. A process in accordance with claim 2, wherein some of the mercury and the additive material is heated so as to be transferred into a gaseous state in which the reaction between the mercury and the additive material takes place.

4. A process in accordance with claim 1, in which at least one of a), b) or c) is performed:
   a) during at least part of the reaction of the mercury and of the additive material the temperature is held at a maximum of 30° C. below the boiling point of mercury,
   b) the additive material and the mercury are introduced in a stoichiometric or in a superstoichiometric ratio,
   c) the reaction is performed in an oxygen-free, inert atmosphere.

5. A process in accordance with claim 1, wherein the additive material and the mercury are supplied in a stoichiometric ratio between 0.16:1 and 0.32:1.

6. A process in accordance with claim 1, wherein the reaction is performed in a closed, gas-tight space in batches and wherein mixing of the additive material and the mercury is performed for a treatment time between 10 minutes and 3 hours.

7. A process in accordance with claim 1, wherein the mixing is performed at a negative pressure.

8. A process in accordance with claim 1, wherein the mixing device is flushed with inert gas before the mercury and the additive material are introduced into the mixing device.

9. A process in accordance with claim 1, which consists essentially of the steps recited in claim 1.

10. A process in accordance with claim 1, wherein the reaction is performed at a negative pressure of 0.1 bar at an absolute pressure of 0.9 bar.

11. A process for immobilizing mercury by producing crystalline mercury sulfide for subsequent disposal of the mercury sulfide, comprising the steps of:
    introducing into a mixing device elemental mercury and an additive material composed of elemental sulfur or a sulfur compound, sealing the mixing device, heating the mercury and the additive material, mixing the mercury and the additive material, and reacting the mercury and the additive material to form the crystalline mercury sulfide, and
    performing at least part of the reaction of the mercury and of the additive material at a negative pressure.

12. A process in accordance with claim 11, in which at least one of the following steps a), b) or c) is performed:
    a) during at least part of the reaction of the mercury and of the additive material the temperature is held at a maximum of 30° C. below the boiling point of mercury,
    b) the additive material and the mercury are supplied in a stoichiometric or in a superstoichiometric ratio,
    c) the reaction is performed in an oxygen-free, inert atmosphere.

13. A process in accordance with claim 11, wherein the additive material and the mercury are supplied in a stoichiometric ratio between 0.16:1 and 0.32:1.

14. A process in accordance with claim 11, wherein the reaction is performed in a closed, gas-tight space in batches and wherein mixing of the additive material and the mercury is performed for a treatment time between 10 minutes and 3 hours.

15. A process in accordance with claim 11, wherein some of the mercury and the additive material is heated so as to be transferred into a gaseous state in which the reaction between the mercury and the additive material takes place.

16. A process in accordance with claim 11, wherein the mixing is performed at a negative pressure.

17. A process in accordance with claim 11, wherein the mixing device is flushed with inert gas before the mercury and the additive material are introduced into the mixing device.

18. A process in accordance with claim 11, which consists essentially of the steps recited in claim 9.

19. A process in accordance with claim 11, wherein the reaction is performed at a negative pressure of 0.1 bar at an absolute pressure of 0.9 bar.

* * * * *